United States Patent [19]

Cennamo

[11] Patent Number: 4,504,257
[45] Date of Patent: Mar. 12, 1985

[54] UNIVERSAL V-BELT

[76] Inventor: Arthur J. Cennamo, 19 Gardenia Dr., Commack, N.Y. 11725

[21] Appl. No.: 387,978

[22] Filed: Jun. 14, 1982

[51] Int. Cl.³ .............................................. F16G 7/02
[52] U.S. Cl. ................................. 474/256; 24/31 C; 474/255
[58] Field of Search .................. 474/253, 255, 256; 24/183, 309, 31 R, 31 B, 31 C; 403/292, 298, 41; 156/137, 138, 139, 157, 158, 294, 303.1, 304.2; 29/433; 285/239, 260, DIG. 22

[56] References Cited

U.S. PATENT DOCUMENTS

| | | | |
|---|---|---|---|
| 2,300,706 | 11/1942 | Schott | 474/256 |
| 2,985,469 | 5/1961 | Bowman, Jr. | 285/DIG. 22 |
| 3,186,048 | 6/1965 | Tann | 24/31 C |
| 3,461,733 | 8/1969 | Peterson | 474/256 |
| 3,501,971 | 3/1970 | Peterson | 474/256 |
| 3,562,871 | 2/1971 | Peterson | 24/31 C |
| 3,605,201 | 9/1971 | Peterson | 24/31 C |
| 3,788,156 | 1/1974 | Jackson | 474/255 |
| 3,922,759 | 12/1975 | Mabie | 24/31 B |
| 4,031,766 | 6/1977 | Beck | 474/254 |
| 4,254,666 | 3/1981 | Seredick | 474/253 |
| 4,437,849 | 3/1984 | Berg | 474/256 |

FOREIGN PATENT DOCUMENTS 456539  11/1936  United Kingdom ............. 24/31 C

Primary Examiner—Leslie A. Braun
Assistant Examiner—Dwight G. Diehl
Attorney, Agent, or Firm—Brumbaugh, Graves, Donohue & Raymond

[57] ABSTRACT

The invention relates to a universal V-belt of the type used in power transmission coupling at least two pulleys together. The belt comprises two elements, a connector element and a tube element. The connector element is uniform in cross-section and has outwardly-directed ridges over its total length. The tube element has a uniform cross-section, and is formed with a continuous longitudinal channel, the walls of which are formed with inwardly-directed ridges. One end of the connector element is inserted into one end of the longitudinal channel for approximately one-half of its length. The other end of the connector is then inserted into the other end of the longitudinal channel. The ridges on the connector and in the longitudinal channel interlock, thereby forming a continuous loop belt solid throughout.

6 Claims, 3 Drawing Figures

UNIVERSAL V-BELT

BACKGROUND OF THE INVENTION

This invention relates to an improved universal V-belt for connecting a pair of rotatable pulleys, such as a fan belt for an automobile engine.

A frequent problem encountered by motorists is the failure of the fan belt during the operation of the vehicle, requiring that the driver stop until repair or replacement of the belt is accomplished. This situation can be aggravated when the belt breaks miles from a service station or repair shop, or if the station does not have an appropriately sized belt in stock.

In many conventional engines, if the fan belt is to be replaced, at least one of the two pulleys about which the belt is connected must be loosened from its mounting and moved toward the other pulley so that a continuous loop-type replacement belt can be draped over the pulleys.

To overcome this deficiency, temporary adjustable V-belts, such as that disclosed in U.S. Pat. No. 4,254,666 to Seredick, have been proposed, wherein first and second ends of a belt, comprising a male and female end, respectively, are coupled by longitudinally interlocking a plurality of laterally disposed inclined teeth near the male end with a plurality of laterally disposed grooves near the female end. Openings are provided in the surface of the belt through which the excess portion of the male end is extended after insertion into the female end.

A disadvantage of the adjustable belt disclosed in U.S. Pat. No. 4,254,666 is that the male end is tapered in thickness for a short length away from the terminal end thereof for ease of insertion into the female end. In the event the belt is to be used to replace a belt connecting two pulleys relatively close to one another, it may be necessary to cut off so much of the male end that the entire tapered end is removed, thereby rendering it difficult, or perhaps impossible, to insert the male end into the female end.

An alternative form of replacement belt is disclosed in U.S. Pat. No. 4,031,766 to Beck. The belt comprises a length of flexible polymeric material, one end of which is reduced in cross-section relative to the rest of the belt to define a male end. The opposite end has a longitudinal channel, equal in length to the male end, to define a female end. After the belt is extended around the two pulleys to be coupled, the excess female end is severed therefrom. An equal length of the male end is then removed. Preferably after the application of a suitable polymeric glue, the male end is inserted into the female end until the male end abuts the inner end wall of the longitudinal channel. The connected ends thus define a continuous loop solid throughout.

A disadvantage of the arrangement disclosed in U.S. Pat. No. 4,031,766 is that, if an error is made in cutting the belt, thus leaving too much of either the male or female end, the belt ends when connected will have either a gap between the terminal end of the male end and the inner end wall of the channel, or the end faces of the belt at the ends of the male and female portions opposite the terminal ends of the portions will not meet, thus leaving a band of belt having a reduced cross-section relative to the rest of the belt. Furthermore, once the male end is covered with glue and inserted into the female end, it may be difficult or impossible to remove it and recut the belt, if possible, to the correct length.

A further disadvantage of both of the above belts is that, owing to the tapered end of the U.S. Pat. No. 4,254,666 patent, and the preformed male end and female channel of the U.S. Pat. No. 4,031,766 patent, the belts are only suitable for replacement or repair of belts around pulleys located within a particular range of distances relative to each other. Accordingly, it may be necessary to have more than one size of the belts made in accordance with either of the above prior art patents to accommodate different sets of pulleys depending upon their relative distances.

SUMMARY OF THE INVENTION

The present invention seeks to overcome these disadvantages by providing a universal V-Belt the individual components of which are of uniform dimension over their entire length, so that as little or as much belt length as is necessary for the particular application may be unrolled, for example, off of a reel or spool. Accordingly, problems associated with present loop type belts, such as stocking an adequate inventory of various sizes, are eliminated.

These and other objects are accomplished by providing a solid connector element of uniform cross-section along its total length having outwardly-directed transverse ridges on its outer surface. The connector element slides into and locks within a second element that is hollow, i.e., tube-like, over its entire length. The tube element is trapezoidal-shaped in cross-section, although the present invention is not limited to such a shape. The inner surface of the hollow tube element have transverse inwardly-directed ridges which interlock with the outwardly-directed ridges on the connector element. Both the connector element and the tube element should comprise a tear-resistant material, for example, a suitable extruded polymeric material.

In accordance with the invention, the tube element is placed around the pulleys to be connected, and the appropriate length is determined and cut off. A portion of the connector element is then drawn off of a reel, for example, to a length equal to or slightly shorter than the length of the tube element, for example, about one-eighth inch (150") less than the length of the tube element.

The end of the connector element is then inserted approximately one half of its length into one end of the tube element. The assembly is placed around the two pulleys and the other end of the connector element is inserted into the other end of the tube element until the two ends of the connector, and the two ends of the tube element, abut each other approximately diametrically opposite each other along the continuous loop. The resulting belt is solid throughout. A suitable polymeric glue may be used, although such is not required in accordance with the invention.

For a better understanding of the present invention reference is made to the following detailed description of the exemplary embodiment illustrated in the attached drawings, and its scope will be pointed out in the appended claims.

DETAILED DESCRIPTION OF THE EXEMPLARY EMBODIMENT

Figure 1:
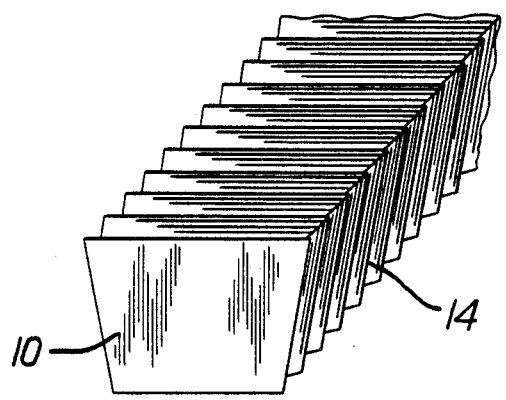
FIG. 1 is a view of a length of connector element of the present invention illustrating the outwardly-directed ridges.
Figure 2:
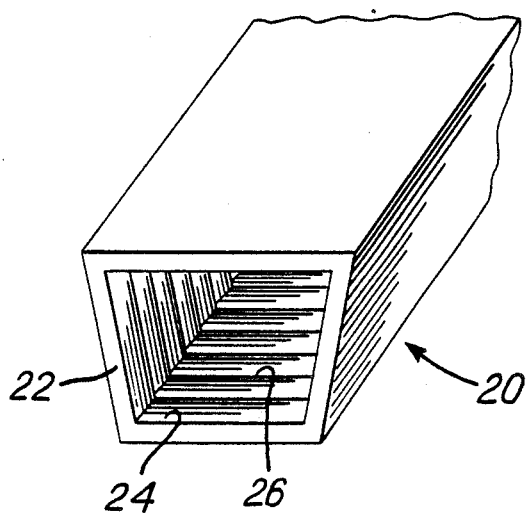
FIG. 2 is a perspective view of the end of the hollow tube element having a trapezoidal cross-section, illustrating the inwardly-directed ridges.

With reference to the drawings, the present invention comprises a connector element 10 (illustrated in FIG. 1) and a hollow tube element 20 (illustrated in FIG. 2). Both the connector element 10 and the tube element 20 may be manufactured, for example, of extruded polymeric material and supplied on reels or spools.

The connector element 10 comprises a solid length of material having a series of outwardly-directed ridges 14 over its entire length. The tube element 20 comprises a length of hollow tube 22, all of the inner surfaces 24 of which being provided with inwardly-directed ridges 26 which are of the same size as the ridges 14 on the connector element 10. As illustrated herein, the tube element 20 and its longitudinal channel are trapezoidal-shaped in cross-section, as is the solid connector element 10. It will be appreciated that the invention is not limited to this particular shape.

In accordance with the present invention, when the replacement belt is to be installed, a section of the tube element 20 is unreeled and the required length cut off. A length of the connector element 10, equal to or slightly less than the length of the tube element 20, for example, approximately one-eighth inch ($\frac{1}{8}''$) less than the required length of the tube element 20, is then cut off of its respective spool or reel.

Figure 3:
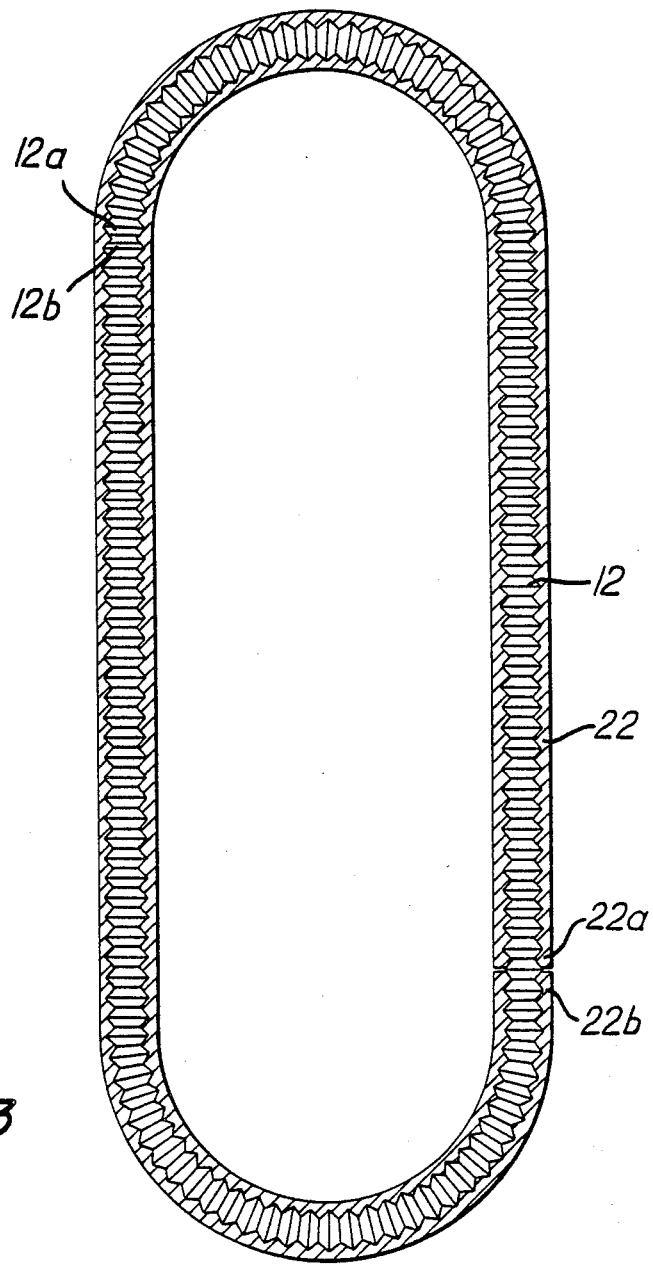
FIG. 3 is an illustration of the universal V-Belt in its assembled condition.

With reference to FIG. 3, a first end 12a of the solid connector 10 is inserted approximately one half of its length into a first end 22a of the tube element 20. A second end 12b of the connector element 10 is then placed into a second end 22b of the belt element 20 until the first end 12a of the connector element nearly abuts the second end 12b of the connector element (owing to the slight difference in the lengths of the tube element and the connector element), and the first end 22a of the tube element 20 abuts the second end 22b of the tube element 20. The seam in the connector 10 is approximately diametrically opposite to the seam in the belt element 20. The resulting belt is solid throughout.

It will be understood by those skilled in the art that the foregoing disclosure relates only to an exemplary embodiment of the invention, and that it is intended to cover all changes and modifications which do not constitute departures from the spirit and scope of the invention set forth in the appended claims.

I claim:

1. A method for repairing or replacing a V-belt of the type used in power transmission for coupling at least two pulleys together, said V-belt comprising (a) a connector element comprising a tear-resistant material of uniform cross-section along its total length, and having outwardly directed ridges transverse to the axis of said connector element over its entire surface, and (b) a tube element comprising a tear-resistant material of uniform cross-section along its total length, said tube element having a continuous longitudinal channel having walls formed with inwardly-directed ridges transverse to said longitudinal channel, said method comprising the steps of:
   (1) determining the required length of said tube element for said repair or replacement V-belt;
   (2) cutting said tube element to said required length;
   (3) determining the required length of said connector element;
   (4) cutting said connector element to said required length;
   (5) inserting a first end of said connector element approximately one half of its length into a first end of said tube element;
   (6) inserting a second end of said connector element into a second end of said tube element until said first and said second ends of said tube element abut each other, whereby a continuous belt which is solid throughout is defined.

2. A method according to claim 1, wherein said required length of said tube element is slightly longer than said required length of said connector element.

3. A method according to claim 2, wherein said required length of said tube element is approximately one-eighth inch ($\frac{1}{8}''$) longer than said required length of said connector element.

4. A method according to any of claims 1-3, wherein the ends of said tube element abut each other at a point approximately diametrically opposite from a point at which said first and said second ends of said connector element meet in said longitudinal channel of said tube element.

5. A universal V-belt of the type used in power transmission for coupling at least two pulleys together comprising
   (a) a connector element comprising a tear-resistant material of uniform cross-section along its total length, and having ridges transverse to the axis of the connector element over its entire surface; and
   (b) a tube element comprising a tear-resistant material of uniform cross-section along its total length, said tube element having a continuous longitudinal channel having interior walls formed with ridges transverse to said longitudinal channel,
   wherein said tube element is adapted to receive said connector element so that the ridges on said connector element interlock with the ridges in said longitudinal channel of said tube element, and
   wherein the ends of said connector element abut each other at a point along said continuous loop belt approximately diametrically opposite from a point at which the ends of said tube element abut, said connector element and said tube element thereby defining a continuous loop belt which is solid throughout.

6. A universal V-belt of the type used in power transmission for coupling at least two pulleys together comprising
   (a) a connector element comprising a tear-resistant material of uniform cross-section along its total length, and having ridges transverse to the axis of the connector element over its entire surface; and
   (b) a tube element comprising a tear-resistant material of uniform cross-section along its total length, said tube element having a continuous longitudinal channel having interior walls formed with ridges transverse to said longitudinal channel,
   wherein said tube element is adapted to receive said connector element so that the ridges on said connector element interlock with the ridges in said longitudinal channel of said tube element, and
   wherein the ends of said connector element are proximate to each other at a point along said continuous loop belt approximately diametrically opposite from a point at which the ends of said tube element abut, said connector element and said tube element thereby defining a continuous loop belt which is substantially solid throughout.

* * * * *